Sept. 17, 1963

J. SWARTZWELDER

3,104,127

ADJUSTABLE MOTOR VEHICLE TRANSPORT

Filed June 14, 1962

INVENTOR.
John Swartzwelder
BY Clarence A. O'Brien
and Harvey B. Jacobson
Attorneys John Swartzwelder
INVENTOR.

John Swartzwelder
INVENTOR.

United States Patent Office 3,104,127
Patented Sept. 17, 1963

3,104,127
ADJUSTABLE MOTOR VEHICLE TRANSPORT
John Swartzwelder, Box 268, R.D. 3, Stoystown, Pa.
Filed June 14, 1962, Ser. No. 201,624
12 Claims. (Cl. 296—1)

This is a continuation-in-part of my copending application Serial No. 848,010 filed October 22, 1959, now abandoned.

This invention embraces the concept of providing a vehicle with upper and lower vehicle supporting decks each comprising a plurality of longitudinally aligned vehicle supporting sections which may be vertically adjusted to enable adjacent vehicle supporting sections to be staggered in height whereby the vehicles being supported thereby may be longitudinally overlapped.

The majority of transportation companies engaged in the transportation of motor vehicles are privately owned and therefore the vehicles these companies use for transporting motor vehicles are at times required to transport motor vehicles of varying dimensions. Heretofore the manufacturers of these transporting vehicles have devised numerous ways to arrange the vehicles being transported on the carrying vehicle in order to be able to carry the maximum number of vehicles without exceeding the maximum length, height, and width regulations which govern the vehicles travelling over the highways of today.

The most common vehicle transport in use today comprises a tractor semi-trailer combination which is provided with upper and lower ramps on the trailer that are adapted to support motor vehicles. These upper and lower ramps are usually inclined to various degrees throughout their entire length being provided with upwardly inclined portions which terminate in downwardly inclined portions in an attempt to carry a maximum number of longitudinally aligned vehicles within a predetermined over-all length of the carrying vehicle.

The present invention, while also being adapted to carry a plurality of longitudinally aligned vehicles on both the upper and lower ramps, does not incorporate the use of continuous upper and lower ramps. Instead, there is provided separate vehicle supporting sections, each of which is adapted to support at least one vehicle, which may be themselves adjusted vertically relative to each other thereby enabling one vehicle supporting section to be positioned lower than an adjacent vehicle supporting section whereby the vehicles supported thereby may be overlapped longitudinally.

The main object of this invention is to provide an adjustable motor vehicle transport adapted to carry a maximum number of motor vehicles while remaining within the maximum length and width dimensions set by various states for the motor vehicles travelling over the highways governed thereby.

A further object, in accordance with the preceding object, is to provide an adjustable motor vehicle transport having upper and lower vertically aligned vehicle supporting decks which each consist of a plurality of longitudinally aligned vehicle supporting sections that may be vertically adjusted relative to each other.

A still further object of this invention, in accordance with the preceding objects, is to provide vehicle supporting sections which may be inclined as well as vertically adjusted to further assist in the overlapping of the vehicles carried by adjacent vehicle supporting sections.

Yet another object, in accordance with the preceding objects, is to provide extensible supports for raising and lowering each individual vehicle supporting section, there being provided a pair of extensible supports for the opposite sides of each end of each vehicle supporting section.

Yet another object, in accordance with the immediately preceding object, is to provide a means whereby each pair of extensible supports supporting one end of each vehicle supporting section may be simultaneously adjusted.

Another object of this invention is to provide an adjustable motor vehicle transport of the tractor semi-trailer type wherein the semi-trailer is of the drop bottom type.

A further object of this invention is to provide an adjustable motor vehicle transport of the semi-trailer type which will enable at least six full size passenger vehicles to be supported from a single semi-trailer in a manner whereby the semi-trailer and/or the load disposed thereon will not exceed the present maximum length, width and height limitations placed on vehicles of this type by the majority of state motor vehicle regulations in this country.

Still another object of this invention is to provide a semi-trailer vehicle in accordance with the preceding objects constructed in a manner whereby the entire load of motor vehicles supported thereby may be loaded and/or unloaded from either end thereof.

A further object of this invention, in accordance with the immediately preceding object, is to provide a semi-trailer for carrying motor vehicles which will be particularly well adapted to be utilized in "piggy back" operations wherein loaded vehicles are loaded upon railroad freight cars and transported over great distances on the freight cars.

Yet another object of this invention is to provide a semi-trailer construction in accordance with the three immediately preceding objects which will be particularly well adapted to have motor vehicles unloaded therefrom directly onto tri-level railroad cars designed specifically to carry motor vehicles and to have motor vehicles loaded thereon directly from tri-level railroad cars.

And a final object to be specifically enumerated herein is to provide an adjustable vehicle transport which will conform to conventional forms of manufacture and be easy to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, the numeral 10 generally designates the adjustable motor vehicle transport comprising the present invention which includes a semi-trailer 12 that is connected to a tractor or prime mover 14 by means of a conventional fifth wheel assembly 16. The vehicle transport 10 includes an upper vehicle supporting deck 20 and a lower vehicle supporting deck 22. The upper deck 20 comprises a plurality of upper vehicle supporting sections 24 while the lower deck 22 comprises a plurality of lower vehicle supporting sections 26. It is to be noted that the upper deck 20 is in vertical alignment with the lower deck 22 and that in the preferred form of the invention shown each vehicle supporting deck includes three vehicle supporting sections.

Although the vehicle transport 10 is shown herein comprising a tractor 14 and a semi-trailer 12, it is to be understood that any form of vehicle transport may be utilized and still fall within the concept of the present invention as long as the transport is provided with upper and lower vehicle supporting decks. Further, the number of vehicle supporting sections in each vehicle supporting deck is not meant to be limited to three inasmuch as different forms of vehicle transports might be able to conveniently utilize more or less vehicle supporting sections in each transporting deck.

The semi-trailer 12 and the tractor 14 are each provided with a frame 28 with the trailer 12 being provided with a drop bottom section 30. Each of the upper sections 24 is supported above the corresponding frame 12 by means of extensible supports 32 which are each disposed vertically and have the lower end fixedly secured to the corresponding frame 12 and the upper end pivotally secured to the corresponding upper section 24 as at 34.

Figure 5:
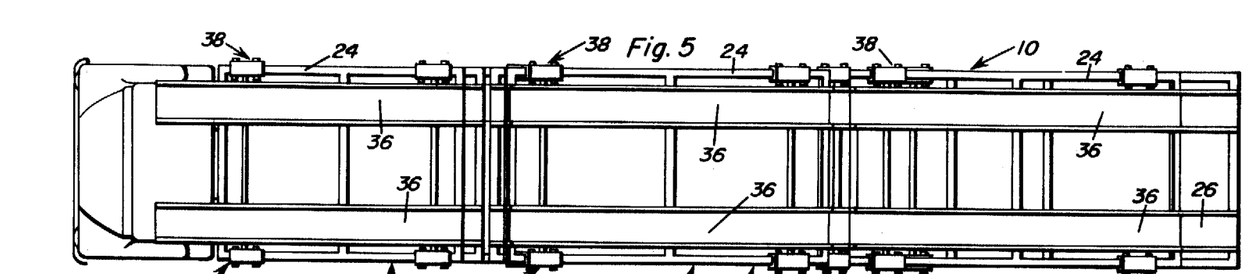
FIGURE 5 is a top plan view of the invention as seen in FIGURE 3 but with the motor vehicles removed therefrom.

With attention now directed more particularly to FIGURE 5 of the drawings, it will be noted that each of the upper sections 24 comprises a rectangular frame-like member having a pair of spaced longitudinally extending runways 36 secured thereto in any convenient manner. Each of the runways 36 is in the form of a U-shaped member adapted to support the wheels of motor vehicles being carried by transport 10 and is in longitudinal alignment with the corresponding runway 36 of the adjacent section 24.

Figure 1:
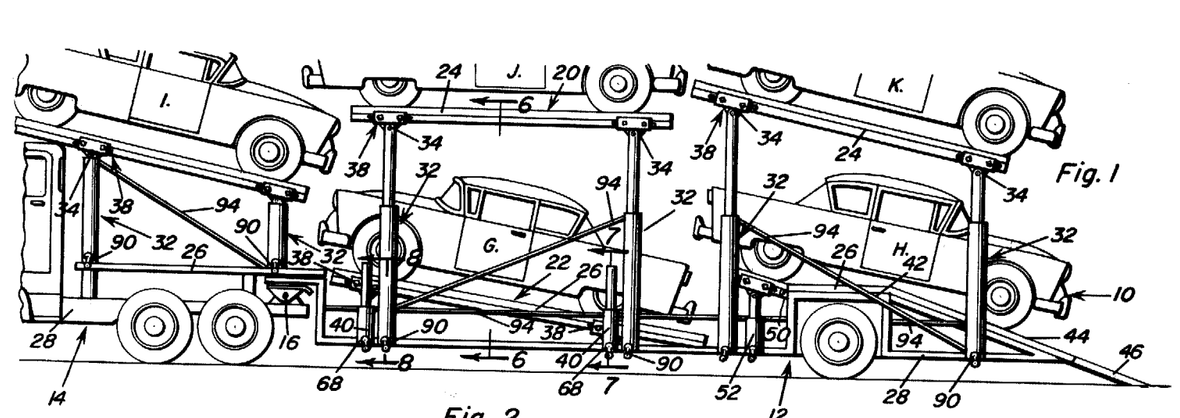
FIGURE 1 is a side elevational view of the invention showing the manner in which adjacent vehicle supporting sections may be horizontally aligned to enable vehicles to be driven from one section to the other.
Figures 3, 4, 9:
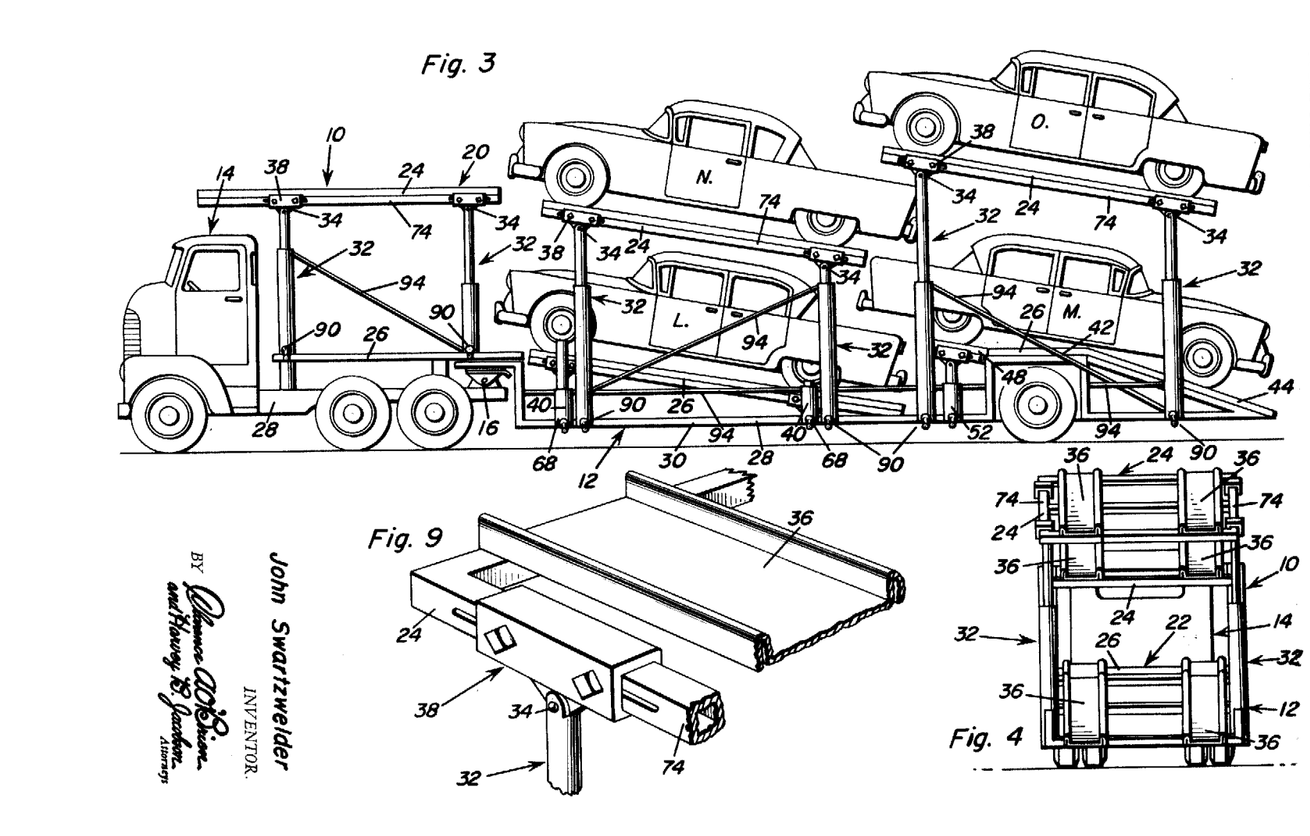
FIGURE 3 is a side elevational view of the invention similar to that of FIGURE 2 but showing the manner in which the transport may be loaded with four large vehicles.
FIGURE 4 is an end elevational view of the vehicle transport as seen in FIGURE 3 but with the motor vehicles removed therefrom.
FIGURE 9 is a fragmentary enlarged perspective view of one corner portion one of the vehicle supporting sections showing the manner in which the upper end of the extensible supports are pivotally and slidably connected thereto.
Figure 6:
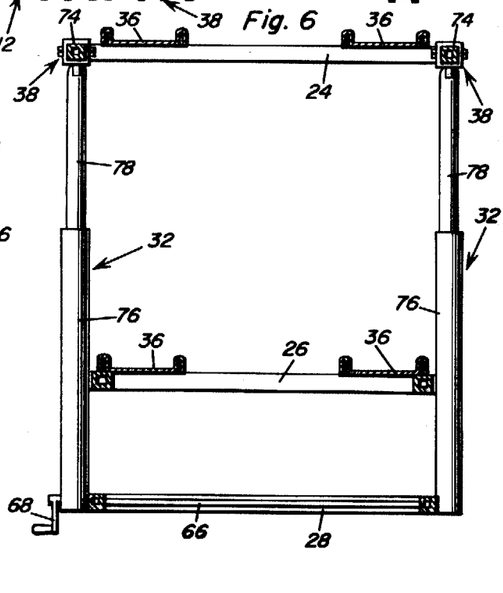
FIGURE 6 is a vertical transverse sectional view taken substantially upon the plane indicated by the section line 6—6 of FIGURE 1.

It will be seen, see FIGURES 1, 6 and 9, that each end of the sections 24 is supported by one pair of the extensible supports 32. Further, it will be seen that the pair of supports 32 supporting the forward portion of each of the sections 24 is also slidably secured thereto by means of a pin and slot connection generally referred to by the reference numeral 38 which enables the opposite ends of each of the upper vehicle supporting sections 24 to be positioned at different heights relative to each other to incline the section 24 supported thereby to further assist the overlapping of vehicles supported by the sections 24.

The lower vehicle supporting section 26 of the tractor 14 and the rearmost section 26 of the trailer are fixedly secured to the frames 28 of the tractor 14 and trailer 12 respectively and the forwardmost lower section 26 of the trailer 12 is supported in a manner similar to the upper section 24, for which support there is provided a plurality of extensible supports 40. The extensible supports 40 are fixedly secured at their lower ends to the frame 28 in any convenient manner and are pivotally secured at their upper ends to the corresponding lower vehicle supporting section 26 in the same manner as the supports 32 are secured to the sections 24.

It is to be understood of course that each of the lower vehicle supporting sections 26 is also provided with a pair of runways 36 as were the supporting sections 24.

The rearmost section 26 of the trailer 12 is provided with a centrally horizontally disposed section 42 which is fixedly secured to the trailer frame 12 and a rearwardly downwardly inclined section 44 to which a ramp 46 may be removably secured in any convenient manner for the purpose of providing a means for driving vehicles up onto the lower vehicle supporting deck 22. Further, the rearmost lower section 26 of the trailer 12 is also provided with a forward section 48 which is pivotally secured to the center section 42 as at 50. The free end of the forward section 48 is supported by extensible supports 52 whereby the free end of the forward section 48 may be adjustably positioned to be in horizontal alignment with the adjacent end of the forwardmost lower section 26 of the trailer 12. The extensible supports 52 are secured rigidly to the frame 28 at their lower ends and are slidably and pivotally secured to the forward section 48 at their upper ends in the same manner as the forwardmost extensible support 40 is secured to section 26.

Figures 7, 8:
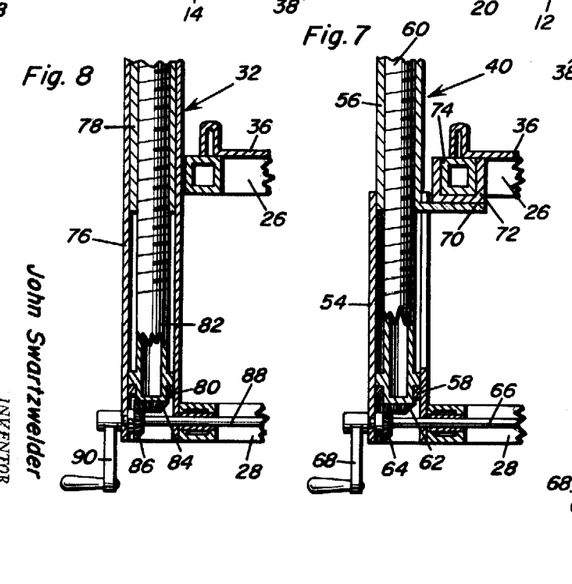
FIGURE 7 is a vertical transverse sectional view taken substantially upon the plane indicated by the section line 7—7 of FIGURE 1.
FIGURE 8 is an enlarged vertical transverse sectional view taken substantially upon the plane indicated by the section line 8—8 of FIGURE 1.
Figure 10:
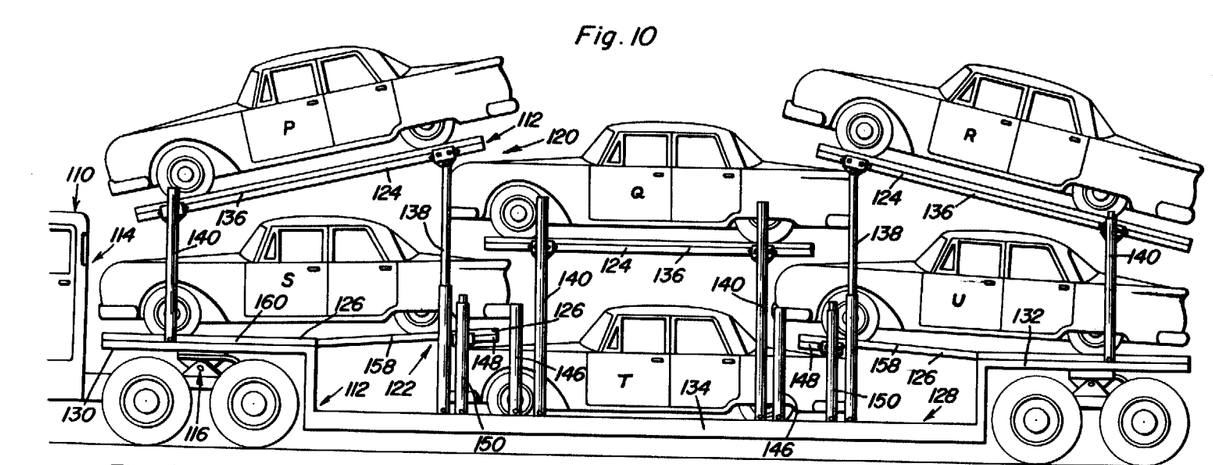
FIGURE 10 is a side elevational view of a modified form of the invention showing the manner in which six vehicles may be supported from the semi-trailer portion of a combination tractor-trailer vehicle constructed in accordance with the present invention.

With attention now directed more particularly to FIGURE 7 of the drawings it will be noted that the extensible supports 40 each includes a lower guide cylinder 54 in which there is slidingly received an internally threaded supporting tube 56 which has its upper end secured to the forwardmost lower section 26 of the trailer 12. Rotatably journaled in the lower end of the guide cylinder 54 by means of thrust bearing 58 is an externally threaded operating rod 60. The operating rod 60 is threadedly engaged with the supporting tube 56 and has provided on its lowermost end a bevel gear 62 which is engaged with a bevel gear 64 secured to the operating shaft 66 which has a handle 68 secured thereto for effecting rotation of the bevel gear 65 and thus rotation of the operating rod 60 to raise and lower the supporting tube 56 and thereby raise and lower the rear end of the forwardmost lower supporting section 26 of the trailer 12. The lower end of the supporting tube 56 is provided with a laterally extending supporting flange 70 to which is secured an upwardly opening U-shaped supporting member 72 which is adapted to receive the side rail 74 of the lower vehicle supporting section 26. The shaft 66 extends transversely of the frame 28 and terminates in the lower portion of the extensible support 40 disposed on the other side of the trailer 12 with similar structure being provided therein for simultaneously raising or lowering both sides of the rear portion of the forwardmost lower vehicle supporting section 26 of the trailer 12 at the same time.

With attention now directed more particularly to FIG-

URE 8 of the drawings it will be seen that each of the extensible supports 32 comprises a guide cylinder 76 fixedly secured at its lower end to the frame 28 by any convenient means having a tubular internally threaded supporting tube 78 slidably disposed therein. Rotatably journaled in the lower portion of the guide cylinder 76 by means of a thrust bearing 80 is the lower end of an externally threaded operating rod 82 which is provided with a bevel gear 84. The operating rod 82 is threadedly engaged with the lower end of the supporting tube 78 which extends upwardly and is pivotally secured to the upper vehicle supporting section 24 as at 34. The bevel gear 84 is engaged with bevel gear 86 secured to operating shaft 88 which has a handle 90 thereon for effecting rotation of the same and thereby rotation of the operating rod 82 to raise and lower the supporting tube 78. The operating shaft 88 also extends transversely of the frame 28 and terminates in the corresponding extensible support 32 on the other side of the frame 28 and is provided with similar mechanisms (not shown) to raise and lower the corresponding extensible support 32 at the same time.

It is to be understood that the structure of the other extensible support 32 is substantially the same and also that the structure of the extensible support 52 is substantially the same as the extensible supports 32 with the exception that the supports 52 are substantially shorter than the supports 32.

Figure 2:
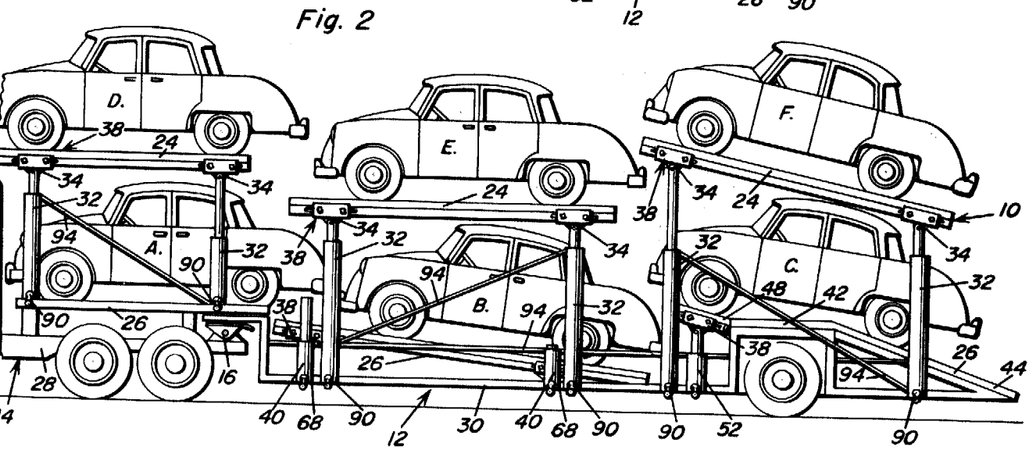
FIGURE 2 is a side elevational view of the invention as seen in FIGURE 1 but with the transport loaded with six small vehicles.

With attention now directed more particularly to FIGURES 1 through 3 of the drawings it will be noted that the vehicle transport 10 may have its upper and lower vehicle supporting sections 24 and 26 so arranged whereby the transport 10 may be adapted to carry six small cars, A through F (see FIGURE 2), five medium size cars, G through K (see FIGURE 1), and four large size cars, L through O (see FIGURE 3). When carrying five medium size cars the lower vehicle supporting sections 26 are first vertically aligned so that car G may be driven along the lower vehicle supporting deck 22 and positioned upon the forwardmost lower vehicle supporting section 26 of the trailer 12. After the car G has been placed in position car H may be backed onto lower vehicle supporting deck 22 and onto the rearwardmost lower vehicle supporting section 26 of the trailer 12 after the rear end of the front supporting section 26 of the trailer 12 is lowered to enable the rear portion of the car H to be positioned over the rear portion of car G. If it is desired the forward end 48 of the rear supporting section 26 may be raised to provide additional clearance. The upper vehicle supporting sections 24 of the trailer 12 and the tractor 14 may then be aligned and a suitable ramp (not shown) may be used to enable the car I to be backed onto the upper vehicle supporting section 24 of the tractor 14 whereupon that section may be lowered until it is positioned as shown in FIG. 1. Car J is then backed onto the forward section 24 of the trailer 12 whereupon that section may be lowered until it is positioned a spaced distance above the vehicle supported by forward section 26 of the trailer. Then car K may be backed upon the rearmost upper vehicle supporting section 24 of the trailer 12. Although the raising and lowering of one car by its supporting section might appear to cause either end of that one car to strike the overlapped end of another car, it is to be understood that each of cars A–O can be longitudinally shifted on the section by which they are supported in order to provide the necessary clearance.

With reference now more particularly to FIGURE 2 of the drawings, it will be noted that the first three small cars A, B and C are loaded on the three lower sections 26 which are adjusted to overlap the confronting ends of adjoining vehicles. Since the smaller automobiles are shorter than the medium sized cars, the car D is positioned on the upper vehicle supporting section 24 of the tractor 14 and cars E and F are positioned upon the upper vehicle supporting sections 24 of the trailer 12 which sections 24 may also be adjusted to enable the confronting ends of adjoining vehicles to overlap.

With particular reference now to FIGURE 3 of the drawings it will be noted that larger cars L through O are of a length too great to be positioned upon either of the vehicle supporting sections of the tractor 14 and that the vehicle transport 10 is adapted to carry four of the large cars L through O upon the upper and lower vehicle supporting sections 24 and 26 of the trailer 12. The first large car L is positioned upon the lower vehicle supporting section 26 supported by the drop bottom 30 and the rear end of the forward section 26 on the trailer 12 is inclined downwardly to provide maximum clearance between the first car L supported thereby and the second large car M supported by the rearmost lower vehicle supporting section 26 of the trailer 12. The upper sections 24 are then aligned and the third large car N is pulled on the forward section 24 of the trailer 12 whereupon the rear end of the forward trailer section 24 is inclined downwardly to enable the fourth car O to be positioned upon the rearmost section 24 of the trailer 12 which is similarly inclined.

It is to be noted that each of the extensible supports 32 and 40 are positioned to lie directly beneath the wheels of the largest vehicle it is expected to have to support.

Further, for clarity sake in the drawings, the upper sections 24 are shown spaced a considerable amount above the tops of the cars positioned therebelow. However, it is to be understood that since cars or vehicles being carried by transports are usually chained down, that the upper sections, when the vehicle transport 10 is loaded and being used, would be positioned but a slight distance above the cars carried by the lower deck 22.

The upper sections 24 are shown in spaced relation with the confronting ends of adjoining sections spaced from each other and there may be provided connecting runways (not shown) for securement between adjacent runways 36 for the purpose of forming a continuous runway when the sections 24 are vertically aligned to enable cars to be moved from one section 36 to another.

It is also to be understood that any one of the cars A–O, depending on size and shape may be loaded facing rearwardly if it is desired to do so to provide more compact loading of the cars on the transport 10.

The transport 10 is shown in the drawings as an open vehicle. However, the vehicle transport 10 could very easily be of the closed van type. This is to say, the semi-trailer 12 could be of a van type similar to those used by trucking companies for transporting bulk material. If the present invention were to be used in a van type semi-trailer the supporting structure shown in the drawings could be incorporated into the construction of the van type vehicle. The bracing supports 94 which are interconnected between portions of the extensible supports 32, 40 and 52 and the frames 28 and 30 would not be necessary in the van type of vehicle inasmuch as the extensible cylinders could be afforded support from the side and end walls of the van.

Further, in either instance, the lower ends of the extensible supports do not have to be fixedly secured to the frame of the vehicle since some trailers are unit constructed without the usual main frame, having only running gear attached to the body.

With reference now to FIGURES 10 through 14, there will be seen a modified form of adjustable motor vehicle transport generally referred to by the refenrce numeral 110. The adjustable motor vehicle transport includes a semi-trailer generally referred to by the reference numeral 112 that is connected to a tractor or prime mover generally referred to by the reference numeral 114 by means of a conventional fifth wheel assembly generally referred to by the reference numeral 116. The vehicle transport 110 includes an upper vehicle supporting deck 120 and a lower vehicle supporting deck 122. The upper deck 120 comprises a plurality of upper vehicle supporting sections 124, while the lower deck 122 comprises a plurality of lower vehicle supporting sections 126. It is to be noted that the upper deck 120 is in vertical alignment with the lower deck 122 and that each of the vehicle supporting sections 124 and 126 be supported from the trailer 112 whereas the forwardmost vehicle supporting sections 24 and 26 are supported from the prime mover 14.

The semi-trailer 112 includes a main frame generally referred to by the reference numeral 128 which includes front and rear upper sections 130 and 132 respectively and a drop center section 134. Each of the vehicle supporting sections 124 comprises a rectangular frame-like member having a pair of spaced longitudinally extending runways 136 similar to runways 36 which are secured thereto in any convenient manner. As in the form of the invention illustrated in FIGURES 1 through 9, the runways 136 of the vehicle supporting sections 124 may be longitudinally aligned.

The adjacent ends of the opposite end vehicle supporting sections 124 are supported by extensible supports 138 which are similar to extensible supports 32. However, the center vehicle supporting section 124 and the remote ends of the opposite ends vehicle supporting sections 124 are supported by means of pairs of extensible supports 140 which are similar to extensible supports 40. In addition, the center lowermost vehicle supporting section 126 which includes a pair of generally parallel runways 144 is supported by means of extensible supports 146 which are also similar to extensible supports 140. Finally, the front and rearmost lower vehicle supporting sections 126 are each provided with swingable sections 148 that are pivotally and slidably connected to the rear and front ends of the front and rear vehicle supporting sections 126 in a manner to be hereinafter more fully set forth. These sections 148 have their adjacent ends supported by means of extensible supports 150 which are also similar to extensible supports 40.

It will be noted that the extensible supports 138, 140, 146 and 150 each include pivotal slidable connections with the adjacent ends of the corresponding vehicle supporting section and that each of the corresponding vehicle supporting sections is longitudinally shiftable relative to its extensible supports.

Figure 14:
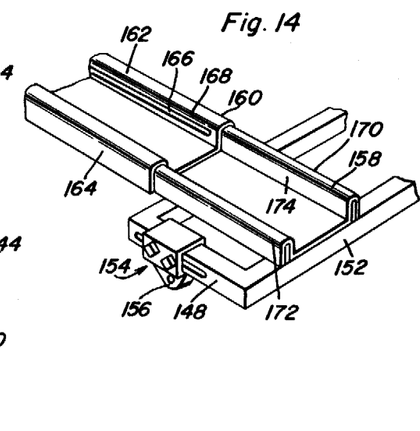
FIGURE 14 is a fragmentary enlarged perspective view of one-quarter portion of one of the vehicle supporting sections of the modified form of semi-trailer showing the manner in which the upper end of the extensible supports are pivotally and slidably connected thereto.

With attention now directed to FIGURE 14 of the drawings, it may be seen that each of the swingable sections 148 includes a generally rectangular framework 152 whose opposite ends are pivotally and slidably connected to the corresponding extensible supports 150 by means of a pin and slot connection assembly generally referred to by reference numeral 154 including a depending apertured lug 156. It is to be noted that a suitable pivot pin is connected between the extensible portion of the associated extensible support 150 and the depending apertured lug 156. Each of the extensible supports 138, 140, 146 and 150 also includes a "pin and slot connection" with the corresponding vehicle supporting sections.

Each of the frameworks 152 has a pair of runways 158 secured thereto at corresponding ends and the other ends of the runways 158 telescopingly received within the ends of the runways 160 are carried by the upper sections 130, 132 of the semi-trailer frame 128.

Each of the runways 158 includes a pair of complementary downwardly opening channel portions 170 and 172 which are thinner than the channels 162 and 164 of the corresponding runways 160 and are telescopingly received within the latter. The inner side walls 174 of the downwardly opening channels 170 and 172 each include a longitudinally projecting lug 175 carrying an inwardly projecting pivot and slide pin 176 which is slidably received in the slot 166 formed in the inner side wall 168 of the corresponding runway 160. In this manner, the ends of the runways 158 remote from the frameworks 152 may be telescoped into the adjacent ends of the corresponding runways 160. The channels 170 and 172 are loosely received within the channels 162 and 164 respectively in order that the adjacent ends of the runways 158 may be raised and lowered by means of the extensible supports when the runways 158 are in their extended positions illustrated in FIGURES 10 through 12 of the drawings.

When it is desired to telescope the runways 158 within the adjacent ends of the runways 160 in order that the semi-trailer 112 may be more effectively used for carrying bulk cargo on the "return trip," the pivot pin (not shown) pivotally connecting the apertured legs 156 to the extensible portions of the extensible supports 150 is removed thereby enabling the frameworks 152 to be laterally displaced longitudinally of the semi-trailer 112. In this manner, a maximum amount of unobstructed area of the semi-trailer may be used for supporting large quantities of bulk cargo when cars are not being carried.

Figure 12:
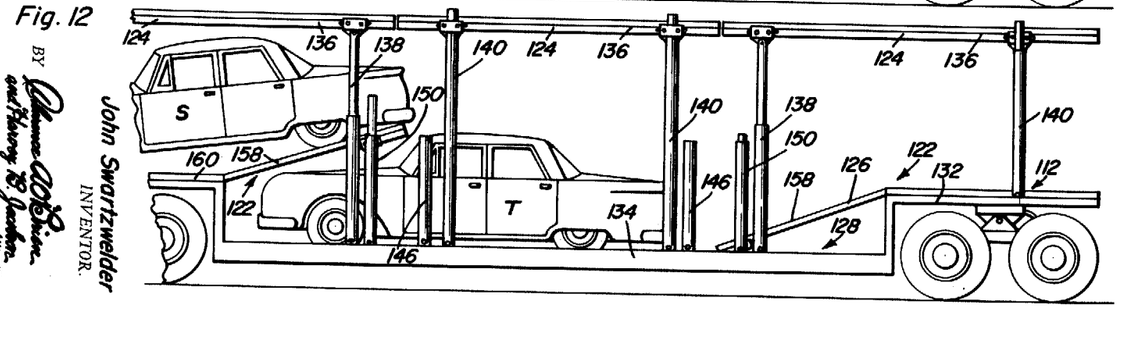
FIGURE 12 is a side elevational view similar to that of FIGURE 10 showing the manner in which the various vehicle supporting sections may be arranged in order to enable the low vehicle supporting sections to be loaded or unloaded from the rear of the semi-trailer portion of the vehicle.
Figure 13:
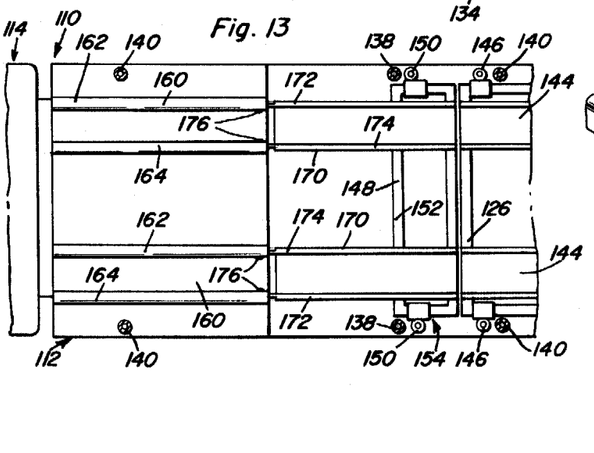
FIGURE 13 is a fragmentary horizontal sectional view of the forward portion of the semi-trailer portion of the vehicle.

In operation, it may be seen that six vehicles P, Q, R, S, T and U may be supported directly from the semi-trailer 112. When loading the semi-trailer 112, the vehicle supporting sections 126 first may be substantially horizontally aligned with the adjacent ends of the runways 158 overlapping the opposite ends of the runways 144 carried by the center low vehicle supporting sections 126. Then, vehicle S may be moved onto the rear of the semi-trailer 112 and into its position illustrated in FIGURE 10 of the drawing. Then, the extensible supports 150 may be extended in order to raise the rear end of car S as viewed in FIGURE 12 of the drawings. Thereafter, the center lowermost section 126 may be dropped and the framework 152 of the rear low vehicle supporting section 126 may be lowered by means of the rearmost extensible supports 150. Then, car T may be driven into the drop center section 134 of the semi-trailer 112 as illustrated in FIGURE 12 of the drawings. Then, the framework 152 of the rear vehicle supporting section 126 may be raised to the position illustrated in FIGURE 10 of the drawings in order that car U may be loaded. Then, the upper deck 120 may have its vehicle supporting sections 124 loaded in a conventional manner after the vehicle supporting sections 124 have been horizontally aligned.

Figures 11, 15:
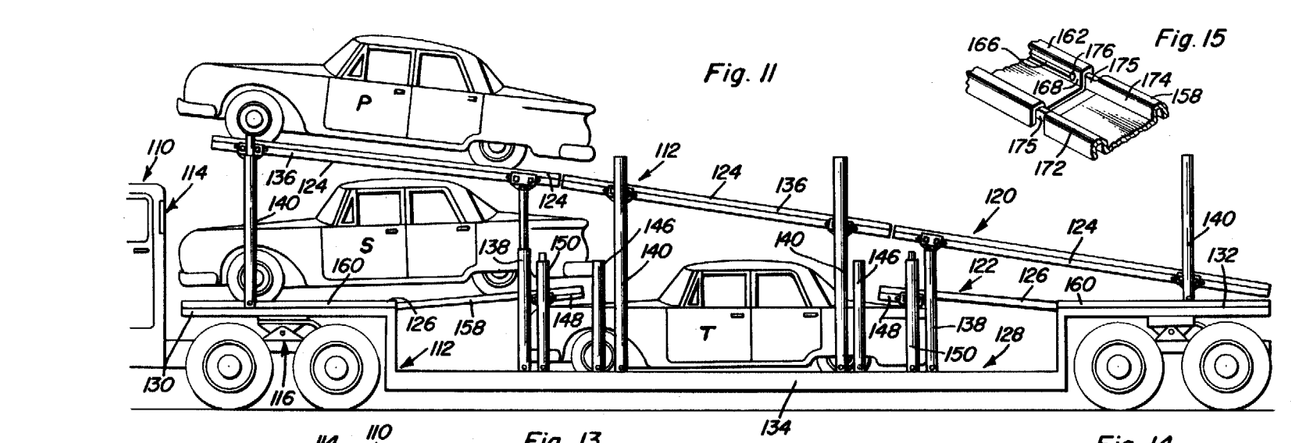
FIGURE 11 is a side elevational view similar to that of FIGURE 10 but showing the manner in which the vehicles carried by the upper vehicle supporting sections may be discharged from the lower level of the rear of the semi-trailer portion of the vehicle.
FIGURE 15 is a fragmentary enlarged perspective view of one of the swingable and extendable runways showing the manner in which it is pivotally and slidably connected to the corresponding vertically adjustable runway.

As an alternative, after the vehicle T has been loaded, the framework 152 of the rear vehicle supporting section 126 may be raised to the position illustrated in FIGURE 11 of the drawings whereupon the car T may be moved rearwardly in order that the rear end of car S may be lowered as viewed in FIGURE 11 of the drawings. Then, the upper deck 120 may be loaded by inclining all three of the vehicle supporting sections 124 in the manner illustrated in FIGURE 11 so that the cars P, Q and R may be loaded from the lower portion of the rear end of the semi-trailer 112. After each of the vehicle supporting sections 124 has had its corresponding car positioned thereon, the vehicle supporting sections 124 may be raised to the positions illustrated in FIGURE 10 of the drawings with the exception that the rear end of the vehicle supporting section 124 supporting car R will be slightly elevated in order to provide clearance for the movement of car U onto the rear lower vehicle supporting section 126.

As a further alternative, the tractor 114 can be jack knifed relative to the semi-trailer 112 in order that the unloading and loading process of the semi-trailer 112 may be duplicated as set forth above with the exception that the cars P, Q, R, S, T and U may be loaded and unloaded from the forward end of the drop center semi-trailer 112.

Inasmuch as the semi-trailer 112 may be loaded or unloaded from either end, it is particularly well adapted for loading cars onto or unloading cars from tri-level railroad cars. In this instance, cars can be located directly from the semi-trailer 112 onto the tri-level railroad cars or directly from the tri-level railroad cars onto the semi-trailer 112. This will of course greatly reduce the loading and unloading time.

While the motor vehicle transport 110 has been primarily designed for "piggy back" operations, it is to be noted that the lower vehicle supporting section 126 may be substantially horizontally aligned in order that bulk cargo such as steel and the like may be carried on the return trip. In addition, the vehicle supporting sections 124 may each be lowered down on top of the corresponding sections 126 when the latter are in their lowermost positions so that all of the portions of the semi-trailer 112 disposed above the lowered sections 124 may be used for bulk cargo. Further, if it is desired, only the center vehicle supporting section 124 may be made vertically adjustable in which case the center upper vehicle supporting section may be provided with extensible supports similar to extensible supports 140, 146 and 150 in order that it may be used as an elevator to raise cars P, Q and R to the upper vehicle supporting deck 120. Thereafter, the remainder of the vehicle supporting sections 126 may be operated as hereinbefore set forth in order to load the low vehicle supporting deck 122.

The foregoing is considered as illustrative only of the principles of the invention. Further, since numerous modifications and changes will readily occur to those skilled in the art, it is not desired to limit the invention to the exact construction shown and operation shown and described, and accordingly, all suitable modifications and equivalents may be resorted to, falling within the scope of the invention as claimed.

What is claimed as new is as follows:

1. In combination, a tractor trailer vehicle combination whose tractor is provided with a first low vehicle supporting section supported from the frame of said tractor and whose semitrailer is provided with a lower dropped center portion including a second low vehicle supporting section, a raised forward end portion pivotally secured to the rear of said tractor and a raised rear end portion provided with a third low vehicle supporting section substantially horizontally aligned with said low section of said tractor, means at opposite ends of said second low vehicle supporting section supporting the latter for height adjustment on said trailer, a pair of upper vehicle supporting sections supported from said trailer and disposed in vertical alignment with said low vehicle supporting sections of said trailer, means at opposite ends of each of said upper sections supporting the latter for individual height adjustment on said trailer, said means supporting opposite ends of said second low section including means for moving said second low section between the positions substantially horizontally aligned with said first and third low sections and a lower position sufficiently spaced below said first and third low sections to enable vehicle supported by said first and third low sections to lap endwise over the opposite ends of a vehicle supported by said second low section, and said means supporting said opposite ends of said upper sections including means for moving said upper sections between lowered positions and adapted to overlie the vehicle supported by said second and third low sections and upper positions enabling clearance between said upper sections and a vehicle moving along said first, second and third lower sections when the latter are horizontally aligned.

2. The combination of claim 1 wherein said tractor also includes an upper vehicle supporting section, means at opposite ends of said tractor upper section supporting the latter for height adjustment.

3. The combination of claim 1 wherein said support means for each of the height adjustable vehicle supporting sections includes means for raising and lowering each end of said last mentioned section independently of the other.

4. The combination of claim 2 wherein said support means for each of the height adjustable vehicle supporting sections includes means for raising and lowering each of the opposite ends of each of said last mentioned sections independently of the other end.

5. The combination of claim 1 wherein said extensible supports are positioned to lie substantially beneath the wheels of the heaviest vehicles which is expected to be supported thereby.

6. The combination of claim 1 wherein the extensible supports are each pivotally secured to the section they support at their upper ends and wherein the supports secured to one end portion of each section are also slidably secured thereto whereby the extensible supports of each section are also slidably secured thereto whereby the extensible supports of one section may be adjusted to incline that section to further assist in the overhanging of the vehicle supported thereby and a vehicle supported by an adjacent section.

7. An elongated vehicle carrier including a first raised front portion, a second dropped center portion and a third raised rear portion, having first, second and third vehicle supporting sections supported therefrom, said first and third sections being substantially horizontally aligned, means at opposite ends of said second section supporting the latter for height adjustment on said carrier, a pair of upper vehicle supporting sections supported from said carrier and disposed in vertical alignment with said second and third low vehicle supporting sections, means at opposite ends of said upper sections supporting the latter for individual height adjustment on said carrier, said means supporting opposite ends of said second low section including means for moving said second low section between positions substantially horizontally aligned with said first and third low sections and a lower position sufficiently spaced below said first and third low sections to enable vehicles supported by said first and third low sections to lap endwise over the opposite ends of a vehicle supported by said second low sceection, and said means supporting said opposite ends of said upper sections including means for moving said upper sections between lowered positions adapted to closely overlie vehicles supported by second and third low sections and upper positions enabling clearance between said upper sections and a vehicle moving along said first, second and third low sections when the latter are horizontally aligned.

8. An elongated vehicle carrier including a first raised front portion, a second dropped center portion and a third raised rear portion, having first, second and third vehicle supporting sections supported therefrom, said first and third sections being substantially horizontally aligned, means at opposite ends of said second section supporting the latter for height adjustment on said carrier, first, second and third upper vehicle supporting sections supported from said carrier and disposed in vertical alignment with said first, second and third low vehicle supporting sections, means at opposite ends of said upper sections supporting the latter for individual height adjustment on said carrier, said means supporting opposite ends of said second low section including means for moving said second low section between positions substantially horizontally aligned with said first and third low sections and a lower position sufficiently spaced below said first and third low sections to enable vehicles supported by said first and third low sections to lap endwise over the opposite ends of a vehicle supported by said second low section, and said means supporting said opposite ends of said upper sections including means for moving said upper sections between lowered positions adapted to closely overlie vehicles supported by said first, second and third low sections and upper positions enabling clearance between said upper sections and a vehicle moving along said first, second and third low sections when the latter are horizontally aligned.

9. An elongated vehicle carrier including a first raised front portion, a second dropped center portion and a third raised rear portion, having first, second and third vehicle supporting sections supported therefrom, said first and third sections being substantially horizontally aligned, means at opposite ends of said second section supporting the latter for height adjustment on said carrier, a pair of upper vehicle supporting sections supported from said carrier and disposed in vertical alignment with said second and third low vehicle supporting sections, means at opposite ends of said second upper section supporting the latter for individual height adjustment on said carrier, said means supporting opposite ends of said second low section including means for moving said second low section between positions substantially horizontally aligned with said first and third low sections and a lower position sufficiently spaced below said first and third low sections to enable vehicles supported by said first and third low sections to lap endwise over the opposite ends of a vehicle supported by said second low section, and said means supporting said opposite ends of said second upper section including means for moving said second upper section between a lowered position adapted to closely overlie a vehicle supported by said second low section and an upper position spaced sufficiently above a horizontal plane in which said first and third low sections are disposed to provide clearance for a vehicle to move along said first, second and third low sections when the latter are horizontally aligned.

10. The combination of claim 7 wherein said vehicle carrier comprises a semi-trailer adapted at one end for connection to a tractor.

11. The combination of claim 7 wherein said first and third sections include elongated and swingable end portions which are disposed on adjacent ends of said first and third sections and are pivotally secured at their remote ends to said adjacent ends for movement about horizontal axis extending transversely of said carrier, and means at opposite sides of the free ends of said swingable end portions supporting the latter for height adjustment on said carrier.

12. The combination of claim 11 wherein said last mentioned means also includes means slidably connecting said remote ends to said adjacent ends for movement of said remote ends longitudinally of said first and third sections into overlapped positions relative to said first and third sections.

References Cited in the file of this patent
UNITED STATES PATENTS

| | | |
|---|---|---|
| 1,894,534 | Dolan | Jan. 17, 1933 |
| 2,611,640 | Francis | Sept. 23, 1952 |
| 2,647,009 | Huebshman | July 28, 1953 |
| 2,908,527 | Risner | Oct. 13, 1959 |

UNITED STATES PATENT OFFICE
CERTIFICATE OF CORRECTION

Patent No. 3,104,127                                    September 17, 1963

John Swartzwelder

It is hereby certified that error appears in the above numbered patent requiring correction and that the said Letters Patent should read as corrected below.

Column 10, lines 17, 44 and 72, before "vehicle", each occurrence, insert -- low --; lines 18, 45 and 73, after "third", each occurrence, insert -- low --; same column 10, lines 19, 46 and 74, after "second", each occurrence, insert -- low --.

Signed and sealed this 7th day of December 1965.

(SEAL)
Attest:

ERNEST W. SWIDER
Attesting Officer

EDWARD J. BRENNER
Commissioner of Patents